Feb. 22, 1955   W. F. H. PURCELL   2,702,711
BEATER BODY CONSTRUCTION
Filed Sept. 13, 1951   2 Sheets-Sheet 1
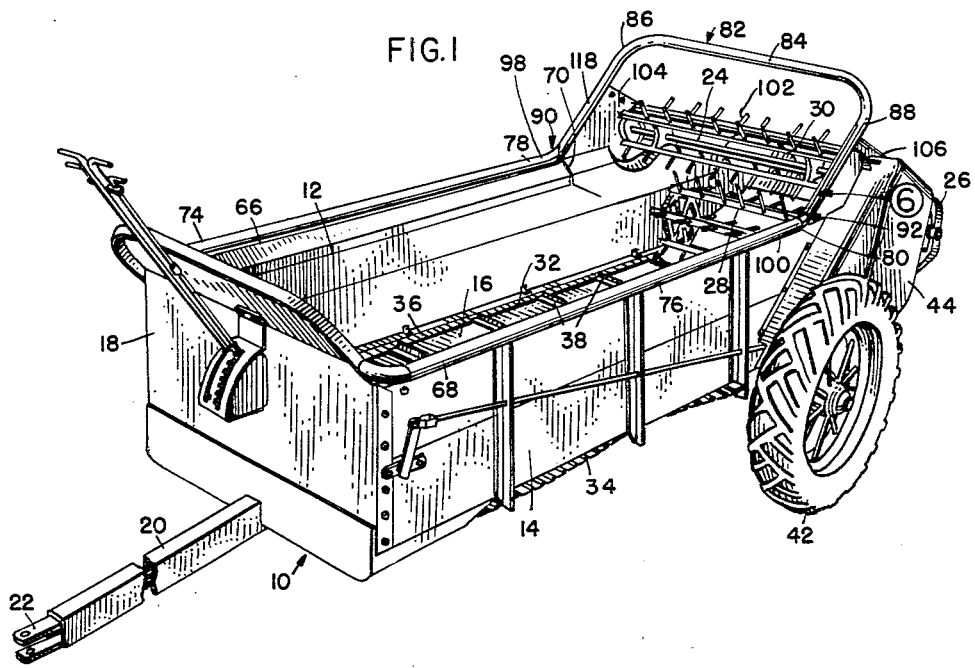
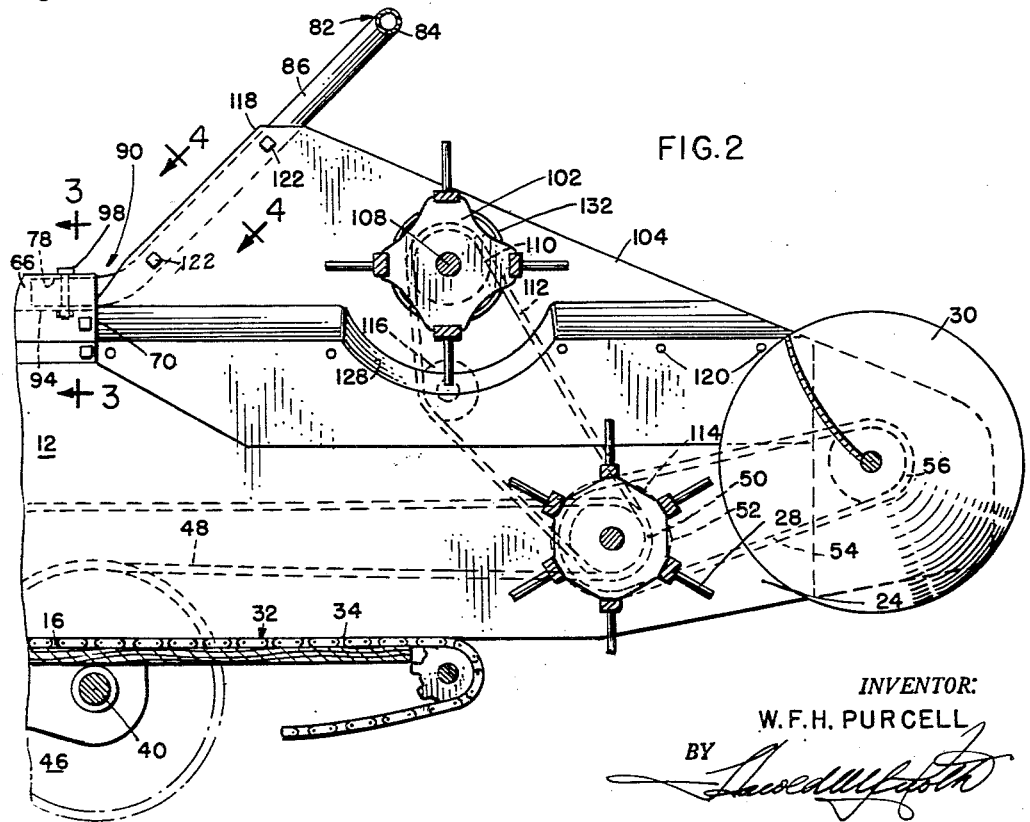
INVENTOR:
W. F. H. PURCELL
BY
ATTORNEY Feb. 22, 1955 W. F. H. PURCELL 2,702,711
BEATER BODY CONSTRUCTION
Filed Sept. 13, 1951 2 Sheets-Sheet 2
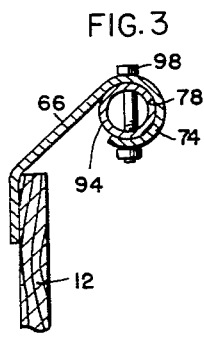
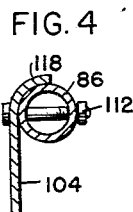
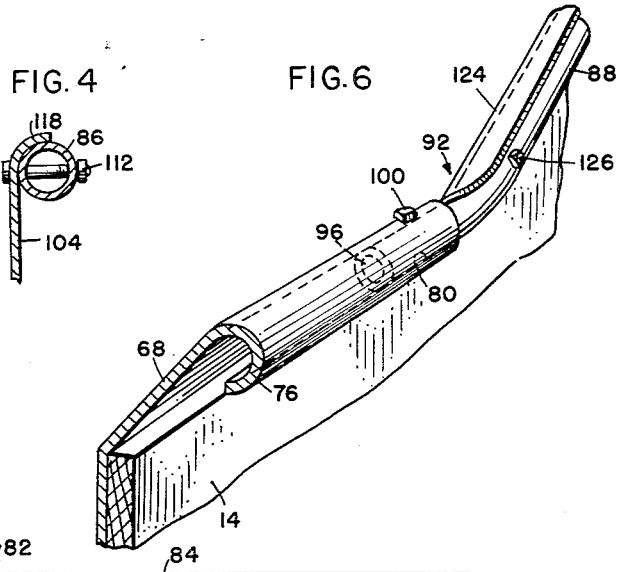
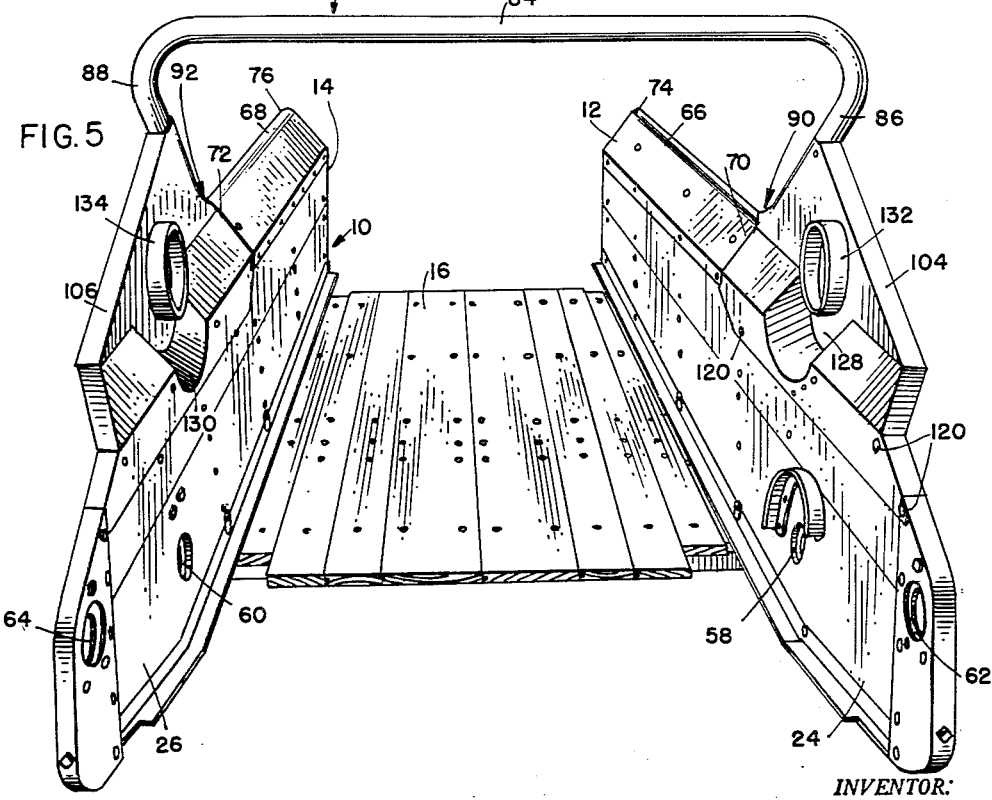
INVENTOR:
W. F. H. PURCELL
ATTORNEY

United States Patent Office 2,702,711
Patented Feb. 22, 1955

2,702,711

BEATER BODY CONSTRUCTION

William F. H. Purcell, Pasadena, Calif., assignor to Deere & Company, Moline, Ill., a corporation of Illinois Application September 13, 1951, Serial No. 246,420

5 Claims. (Cl. 275—3)

This invention relates to vehicle body construction and more particularly to improved body structure for a vehicle of the manure spreader type conventionally employed in spreading manure on farm land.

A typical spreader construction will comprise an elongated body having a floor and upright side walls. This body is loaded with manure and feeding mechanism is used to advance the load to the rear open end of the body, at which point spreading mechanism takes over and spreads the manure over an area considerably wider than would be possible if the load were merely dropped off the end of the spreader body. In order to facilitate the distribution of the manure, beater means is conventionally utilized to disintegrate the manure before it is handled by the spreading means. This beating mechanism usually takes the form of upper and lower beaters, each of which has a plurality of teeth thereon for breaking up and reducing in size the packed and matted manure. The problem is quite acute because the manure is normally mixed with straw from the bedding of the animals. Normally the manure is accumulated into relatively large piles which result in considerable packing and matting of the manure. Further, the manure does not become broken up as it would if loaded by hand, because at present there is a wide-spread use of mechanical manure loaders which have buckets capable of handling large quantities of manure. An additional problem is encountered because the operator habitually loads the spreader to such an extent that the manure is piled to an appreciable height above the level of the top edges of the upright side walls of the body. In many cases, if the manure were allowed to advance rearwardly by the incremental feeding means, the lower beater would operate to undermine the load so that an upper portion of the load in a relatively large clump would be discharged without being efficiently spread. It is therefore the conventional practice to utilize a retarder. Normally, this retarder takes the form of the transverse part of an arch member having depending legs secured respectively to the upright side walls so that the transverse part extends across the body directly above the upper beater. Experience has shown that the retarding effect of the conventional arch is too great and the upper part of the load is prevented from reaching the spreading mechanism at the proper time; that is to say, the lower beater undermines the lower portion of the load until a point is reached at which smaller quantities of manure are distributed than are actually desired, and subsequently the upper portion of the load will drop down and will be discharged in relatively large clumps. The net result is that the distribution lacks uniformity. Heretofore, efficiency could be maintained only at the expense of additional hand labor involved in breaking loose the upper portion of the load from the retarder means so that the machine would operate efficiently.

According to the present invention, these problems are eliminated by the provision of what appears to be a radical change in the arch design and the relationship thereof to the side walls of the body. Primarily, the arch is disposed so that its depending legs slope downwardly and forwardly, thereby forming obtuse angles with the respective side walls. Additionally, the arch in section has a smoothly rounded contour and the junctions between the legs of the arch and the respective side walls are rounded so as to eliminate all sharp corners that would otherwise cause pockets or traps for portions of the load. In conventional designs, the arch has a second function in serving as a transverse brace. In the present invention, this original function is retained. Therefore, by virtue of the simple change referred to, the over-all efficiency of the spreader is materially increased, particularly in cases in which the manure is excessively matted because of straw. In a preferred embodiment of the invention, each side wall has an upper laterally inclined flare provided with a rolled outer edge. The arch is preferably of tubular construction and the legs of the arch are received by the rear end portions of the rolled edges of the flared extension, thus affording the smooth concave joints referred to above.

The foregoing and other important objects and desirable features inherent in and encompassed by the invention will become apparent on the basis of the following detailed description and accompanying sheets of drawings in which:

Figure 1 is a three-quarter perspective view of a spreader embodying the invention;

Figure 2 is an enlarged fragmentary sectional view showing the relationship between the upper and lower beaters and the improved arch construction;

Figure 3 is an enlarged transverse sectional view taken on the line 3—3 of Figure 2;

Figure 4 is a fragmentary enlarged sectional view taken on the line 4—4 of Figure 2;

Figure 5 is a perspective view of the spreader body as seen from the rear end, the beaters and spreading means having been omitted; and Figure 6 is an enlarged fragmentary perspective view as seen generally in the direction of the narrow bearing the encircled numeral 6 in Figure 1.

The spreader chosen for the purpose of illustration here is of the two-wheel type normally drawn behind a tractor. Of course, the principles of the invention are applicable to spreaders of other types. It is not unconventional to utilize a spreader in which the discharge end will be at the front. Therefore, the use herein of such expressions as "front" and "rear" is for convenience only and these words are not to be construed as indicating that the spreader cannot be constructed other than in the specific manner described. The same observation obtains relative to the claims, in which such expressions have been used in the interests of convenience and brevity.

The spreader vehicle or machine comprises an elongated body 10 having right- and left-hand upright side walls 12 and 14, a horizontal floor 16, and a transverse upright front wall 18. The rear end of the body is open, as will be seen in Figures 1 and 5 particularly.

Here, as elsewhere in the description, the expressions "right-hand" and "left-hand" are used with reference to the position of an observer standing behind the spreader and looking forwardly.

The front end of the body is equipped with a forwardly extending draft tongue 20 having a clevis 22 by means of which the spreader may be connected to and drawn by an agricultural tractor, as is conventional.

The side walls 12 and 14 respectively have rearward extensions 24 and 26 that extend rearwardly of the terminal rear end of the floor 16 (Figure 5). These rearwardly extending portions are utilized as supporting means for a lower beater means 28 and a transverse spreading means in the form of a distributing auger 30. The spreader is loaded with manure or other material to be distributed and the load is advanced rearwardly in increments by feeding mechanism comprising a feeding apron 32 made up of a pair of longitudinally running endless chains 34 and 36 cross-connected by a plurality of transverse, longitudinally spaced slats 38 (Figures 1 and 2). This apron is advanced so that its upper run and the slats thereon move rearwardly over the upper surface of the floor 16, the lower run returning below a transverse axle 40 at opposite ends of which are carried right- and left-hand supporting wheels, only the latter of which appears at 42 in the drawings. This wheel is connected by appropriate apron-driving mechanism (in the present instance enclosed in a sheet metal housing 44 at the rear left-hand side of the body). The details of this mechanism are not important here and may be of any suitable type, an example of which appears in U. S. Patent No. 1,637,232. The fundamentals in any case are these: As the spreader is drawn forwardly, the rotating wheel imparts a driving fore to the apron to cause the apron to operate in the manner briefly described above.

As shown in Figure 2, the other wheel (not illustrated) may serve to drive a sprocket 46 that is selectively engageable with the lower run of an endless chain 48. This chain is trained about a sprocket 50 keyed to the shaft on which the lower beater 28 is mounted. The shaft for the beater 28 carries a second and larger sprocket 52 about which is trained another endless chain 54. This chain is in turn trained about a sprocket 56 at the right-hand end of the shaft that carries the distributor 30. Here again, the illustrated drive is merely representative of many forms that could be utilized. A typical arrangement involving a drive similar to that just referred to forms the subject matter of U. S. Patent No. 2,342,837.

In Figure 5, openings 58 and 60 appear respectively in the side walls 12 and 14. These openings receive bearings for carrying opposite ends of the lower beater 28. A pair of openings 62 and 64 in the extreme end portions of the rear extensions 24 and 26 carry bearings for rotatably supporting opposite ends of the distributing auger 30.

Figure 5 also emphasizes the provision on the side walls 12 and 14 of outwardly and upwardly inclining flared extensions 66 and 68, respectively. In the particular construction shown, the flared extension 66 has a rear terminal end 70 short of the zone in which the lower beater 28 operates. The left-hand flared extension 68 at 72 in transverse alinement with the terminal end portion 70 of the right-hand flare 66. The flares have longitudinal outer edge portions 74 and 76 respectively that are rolled to give each flare a hollow, substantially tubular cross section (Figure 3). Because of the termination of the flare 66 at 70, the rolled edge thus provided forms what may be termed a pocket 78 that opens rearwardly generally at the level of the upper edge of the side wall 12. Broadly speaking, the flare and its components define the upper edge element of the wall 12. A similar relationship exists between the left-hand wall 14 and its flare 68, the latter having a rearwardly opening pocket 80 (Figure 6).

One of the important features of the present invention is the provision of retarder means in the form of a transverse arch designated generally by the numeral 82. This arch has a bight 84 and right- and left-hand legs or supports 86 and 88. The arch is preferably of one-piece tubular construction and therefore in section has a smoothly rounded contour. As best shown in Figures 1 and 2, the arch is secured to the body and is arranged so that the legs 86 and 88 incline or extend downwardly and forwardly to smoothly faired junctions 90 and 92 with the respective side wall flares 66 and 68.

The free or forward ends of the legs 86 and 88 are respectively formed as forward extensions 94 and 96 respectively receivable in the pockets 78 and 80 at the rear terminal ends of the flares 66 and 68. Bolts 98 and 100 respectively complete the mountings at the points noted. The angle formed between the leg 86 and its forward extension 94 is an obtuse angle but the corner is curved on a relatively large radius, thus contributing materially to the smooth junction at 90. The same relationship obtains at the other side of the body. Stated otherwise, each of the junctions 90 and 92 provides a concave curve as respects the disposition of the arch 82 relative to the side walls of the body. The fairing of the flare 66 into the leg 86 of the arch 82 is interrupted only by the thickness of the sheet metal section of which the flare 66 is formed. In the present circumstances, this slight distinction is virtually immaterial. At any rate, the step-down is in favor of non-obstruction, since the smaller section of the leg 86 is rearwardly of the relatively larger section of the rolled edge 74. Since the load in the body is moved rearwardly, the difference in size forms no obstruction. The same applies relative to the symmetrical construction at the left-hand side of the body.

As will be observed in Figure 2, the disposition of the arch 82 is such that the transverse bight 84 is at a considerably higher level above the floor 16 than is the upper edge of the side wall as defined by the flare 66. It will also be observed that the position of the transverse bight 84 is substantially the same as that utilized in conventional arch constructions. As will be brought out hereinafter, the bight 84 cooperates in a not unconventional manner with upper beater means in the form of a rotary spiked beater 102. This beater is supported at opposite ends respectively by the side walls 12 and 14 through the medium of what might be termed secondary supports 104 and 106. The beater 102 includes an axial shaft 108 at the left-hand end of which is carried a sprocket 110. This sprocket has been included diagrammatically in Figure 2, although it would not otherwise appear in the section. The purpose of this form of illustration is to complete the illustration of the driving mechanism. A chain 112 is trained about the sprocket 110 and about a third sprocket 114 on the shaft of the lower beater 28. An idler is illustrated at 116 for maintaining the proper tension in the chain 112. In the present instance, the driving chain 112 and the sprockets 110, 114 and 116 will be enclosed in the shield 44 previously described. Again, it may be said that these details are relatively unimportant and are illustrated merely for the purposes of facilitating an understanding of the basic operation of the spreader.

The beater 102 is thus located directly below the bight 84 of the arch 82 and, as will be hereinafter brought out, the bight 84 serves as a retarder that makes more efficient the operation of the beater 102, particularly in certain circumstances to be pointed out.

Each of the secondary supports (104 and 106) supplements the supports provided respectively by the legs 86 and 88 of the arch 82 and in a broad sense the secondary supports may be considered respectively parts of the side walls 12 and 14.

The secondary support 104 is in the form of a sheet metal side wall extension of elongated construction having a forward edge 118 rolled over the upper surface portion of the rearwardly and upwardly sloping leg 86. The lower portion of the sheet metal extension 104 is secured to the side wall rearward extension 24, a plurality of bolts 120 being used for this purpose. The rolled portion 118 at the forward end of the support or extension 104 may be secured to the leg 86 by a pair of bolts 122. A similar arrangement exists at the left-hand side of the body, at which side the forward portion of the left-hand supporting extension 106 is rolled over the upper surface of the leg 88, as at 124, being secured thereto by a plurality of bolts 126. Figure 6 shows the relationship between the rolled portion 124 and the junction 92, illustrating that the fairing of the flare 68 into the arch is not materially interrupted by the presence of the supporting extension 106. The idea in all respects as to the junctions 90 and 92 is to make these junctions as smoothly contoured as possible so that there are a minimum of obstructions to the rearwardly moving load.

The spacing between the upper portions of the supporting extensions 104 and 106 is on the order of the transverse dimension between the rolled edges 74 and 76 of the flares 66 and 68. Therefore, the length of the beater means 102 is commensurate with the width between the upper edge portions of the side walls 12 and 14. For this purpose, the extensions 104 and 106 are pocketed respectively at 128 and 130 to accommodate the ends of the beater 102. Enclosure members 132 and 134 are secured respectively to the supporting extensions 104 and 106 for preventing wrapping of material around the extreme ends of the beater 102.

Since the supporting extensions 104 and 106 may be considered integral parts of the side walls 12 and 14 and since the supporting extensions are secured to the legs 86 and 88 of the transverse arch 82, the sides of the rear parts of the spreader are completely enclosed in the zone of operation of the beater 102. Furthermore, in a broad sense, the beater may be considered to be supported by the legs 86 and 88.

The fundamentals involved in the operation of the spreader are concerned primarily with the retarding effect of the arch 82 and the absence of obstructions to the rearwardly moving load. It must be considered first of all that the operator normally overloads the spreader so that the load is at a height considerably above the rolled edges 74 and 76 of the flared side walls 12—66 and 14—68. Since the manure will be considerably matted and packed with straw, portions of the load will overhang laterally at each side of the body. As the apron 32 moves the load rearwardly in increments, the upper portion of the load has a tendency to climb the inclined or sloping legs 86 and 88. In the meantime, the lower beater 28 is operating to disintegrate the lower portion of the load and is undermining the upper portion of the load. Since the junctions at 90 and 92 are free of obstructions, the upper portion of the load cannot pack and wedge at the arch. Thus, as sufficient portions of the lower part of the load are undermined by the lower beater 28 and since the upper portion of the load is slowly moving relative to the upper beater 102, the upper beater will perform its disintegrating function and the disintegrated portions of the load may then drop down to the lower beater and thence will be thrown to the distributing auger 30. Stated otherwise, the upper portion of the load will not pack and wedge at the arch and therefore will not hang up at the upper beater. The result is that the beaters operate uniformly to disintegrate appropriate portions of the load so that the scattering or spreading is performed efficiently.

Other features of the invention reside in the facility with which the spreader body may be assembled and the ease with which repairs may be made when necessary. For example, the arch is of one-piece construction and is easily and adequately supported at 98 and 100, in addition to being removably supported by the rolled portions 118 and 124 respectively of the supporting extensions 104 and 106. Thus, although the legs 86 and 88 of the arch slope rearwardly, the pressure of the load thereon is adequately compensated for by the bracing effect of the forward portions of the extensions 104 and 106.

Other features of the invention not specifically enumerated herein will undoubtedly occur to those versed in the art, as likewise will numerous modifications and alterations in the preferred embodiment of the invention illustrated, all of which may be achieved without departing from the spirit and scope of the invention as defined in the appended claims.

What is claimed is:

1. In a material spreader, the combination of: an elongated horizontal floor having front and rear ends and opposite sides; upright side walls secured respectively to and running lengthwise of the sides of the floor to define with said floor a material-carrying body open at its rear end for the discharge of material; each side wall having an upper edge extending from front to rear thereof and comprising a substantially straight and horizontal portion extending from front to rear a major part of the length of the side wall to a point short of the rear end of the body, a continuing upwardly curved portion at said point, and a continuing rearwardly and upwardly sloping portion running from said curved portion to a top portion above the level of said straight portion; an arch member secured to the body adjacent to the rear end thereof, said arch member having a bight and a pair of legs and arranged with the legs respectively following the sloping edge portions, each leg having a lower curved part conforming to the respective curved edge portion and an upper leg part continuing upwardly and rearwardly beyond the respective top edge portion substantially as a continuation of said sloping edge portion, and the bight having its opposite ends joined to said upper leg parts to extend across the body; and means on the side walls intermediate the floor and the bight of the arch member and in transverse alinement on a line directly below the bight of the arch member for carrying a movable beater.

2. The invention defined in claim 1, further characterized in that: each leg of the arch is of smoothly contoured cross-section; the lower curved part of each leg terminates at the junction of the straight and curved edge portions of the respective side wall; and the curved edge portion, the sloping edge portion and at least the rear part of the straight edge portion of each side wall are rolled outwardly over the respective leg of the arch.

3. In a material distributor of the type having an elongated body made up of front and rear ends, a floor and longitudinal upright side walls and over which floor and between which side walls material may be moved for discharge at said rear end, and movable beater means between the planes of the side walls adjacent said rear end and operative above the level of the floor to operate on discharging material, the improvement comprising: a pair of transversely spaced and alined supports carrying the beater means and respectively fixed to and upstanding from the side walls, each support including an upper edge portion sloping downwardly and forwardly from the general level of the beater means toward a junction with the upper edge of the respective side wall ahead of the beater means; an arch member having a bight and a pair of legs spaced apart on the order of the transverse spacing between the sloping edges of the supports and supported by the body with said legs respectively following said sloping edges to said junctions with the upper edges of the side walls and with the bight extending transversely between the supports and over the beater means; and means at the junction of the upper edge of each side wall and the sloping edge of its respective support providing a smoothly concave connection between said side wall upper edge and the respective leg of the arch member.

4. In a material spreader of the type having an elongated body including front and rear ends, a floor and upright side walls, each side wall having an upper edge extending from front to rear thereof and a transverse movable beater crosswise between the side walls and above the level of the floor at the discharge end to operate on discharging material, the improvement comprising: means on and lengthwise of each side wall upper edge including an elongated element of hollow cross-section, each element terminating short of the position of the beater to form a rearwardly facing pocket ahead of the beater; an arch member having a pair of parallel legs and a bight joining the legs and arranged with the free ends of the legs received respectively in the pockets formed by said elements, said legs sloping upwardly and rearwardly to dispose the bight transversely of the body rearwardly of and at a level above said pockets and directly over the beater; a pair of supports in the form of side sheets adjoining and extending downwardly respectively from the legs to and adjoining the upper edge portions of the side walls rearwardly of the pockets; and means on the side sheets for respectively carrying opposite ends of the beater.

5. The invention defined in claim 4, further characterized in that: the bight and legs of the arch member are of smoothly contoured cross-section and each leg is straight for a major portion of its length and has its free end curved to be received by its respective pocket to form a smooth junction between the leg and the respective upper edge element; and each side sheet has an upper edge portion directed smoothly outwardly over the respective leg and faired into the smooth junction between the respective leg and upper edge element.

References Cited in the file of this patent

UNITED STATES PATENTS

| Number | Name | Date |
|---|---|---|
| 1,315,818 | Davis | Sept. 9, 1919 |
| 1,471,087 | Zint | Oct. 16, 1923 |
| 1,879,114 | Crumb et al. | Sept. 27, 1932 |
| 2,302,879 | Neighbour et al. | Nov. 24, 1942 |
| 2,360,126 | Griffiths | Oct. 10, 1944 |
| 2,397,429 | Neighbour et al. | Mar. 26, 1946 |
| 2,504,442 | Neighbour et al. | Apr. 18, 1950 |
| 2,657,583 | Neighbour | Nov. 3, 1953 |